E. ACKORS.
COTTON HARVESTER.
APPLICATION FILED APR. 10, 1908.

916,522.

Patented Mar. 30, 1909.

UNITED STATES PATENT OFFICE.

ELIAS ACKORS, OF GUTHRIE, OKLAHOMA.

COTTON-HARVESTER.

No 916,522.  Specification of Letters Patent.  Patented March 30, 1909.

Application filed April 10, 1908. Serial No. 426,285.

*To all whom it may concern:*

Be it known that I, ELIAS ACKORS, a citizen of the United States, residing at Guthrie, in the county of Logan and State of Oklahoma, have invented certain new and useful Improvements in Cotton-Harvesters, of which the following is a specification.

This invention relates to that class of cotton-harvesters characterized by a rotating picker-spindle, and it has for its object to provide a machine of this kind which is simple in construction, and rapid and efficient in operation.

Figure 1:
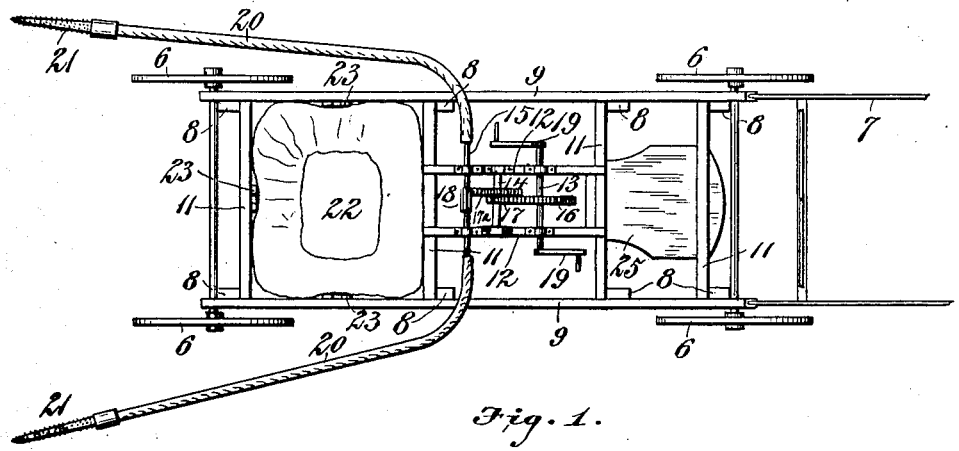
Figure 2:
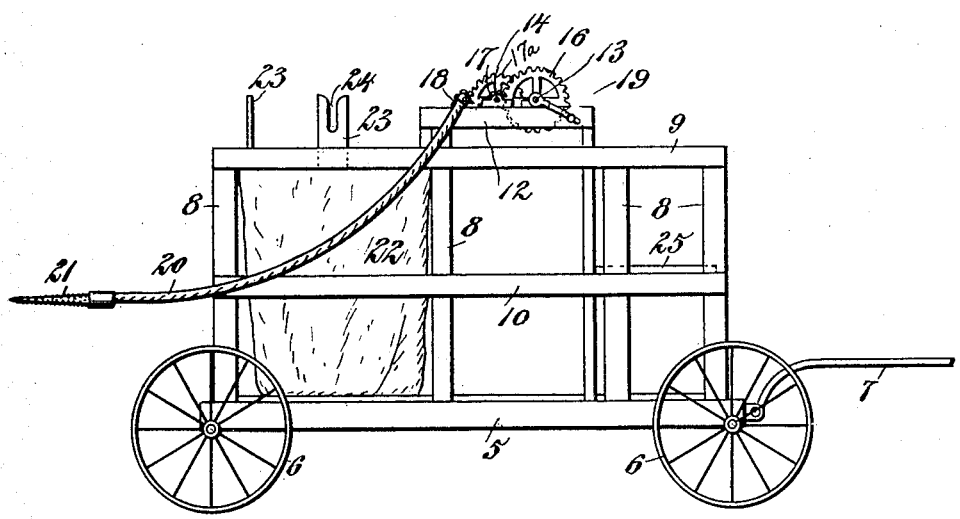

In the accompanying drawing, Figure 1 is a plan view of the invention, and Fig. 2 is a side elevation thereof.

Referring specifically to the drawing, 5 denotes two spaced longitudinal bars mounted at their front and rear ends on wheels 6, and having connected to their front ends shafts 7 for attachment of a draft-animal. From the bars 5 rise posts 8 connected at the top by longitudinal bars 9, and at the middle by longitudinal bars 10. The posts are also connected at the top by cross-bars 11. At the top of this frame work, and at or about the middle thereof, are mounted spaced longitudinal beams 12 provided with bearings for three transversely extending shafts 13, 12, and 15, respectively. On the shaft 13 is a spur-wheel 16 which meshes with a pinion 17 on the shaft 14, and on the shaft 15 is a pinion 18 which meshes with a spur wheel 17ª on the shaft 14. This train of gearing is employed in order to rotate the shaft 15 at a high rate of speed. The shaft 13 is fitted with hand-cranks 19 for imparting motion thereto.

To each end of the shaft 15 is connected a suitable length of flexible shafting 20 which carries the picker-spindles 21. These spindles taper to a point and have a roughened or notched outer surface.

At the rear end of the supporting-frame of the machine is carried a bag 22 to receive the picked cotton, and on the frame, adjacent the mouth of the bag, are mounted upstanding metal plates 23 having slots 24 extending downwardly from the top thereof. These slotted plates are for the purpose of removing the cotton from the picker-spindles as will be presently described.

At the front end of the machine is a platform 25 on which the operator of the driving-mechanism stands.

In use, the machine is driven along a row of plants, the operator standing on the platform 25 and the picker-spindles being each carried by a laborer. Upon reaching the plants to be stripped, the machine is stopped, and the picker-spindles are set in motion by the operator turning the shaft 13 by means of the cranks 19. The picker-spindles are brought into contact with the cotton and as they rotate at a high rate of speed by reason of the gearing herein described, the cotton is quickly torn from the bolls and wrapped around the spindles. When a sufficient amount of cotton has collected on the spindles they are drawn through the slots 24 whereby the cotton is stripped off and drops into the bag 22. Two rows of plants may be operated on, one laborer operating one of the picker-spindles on one row, and another laborer operating the other picker-spindle on the other row. When all the plants within reach of the picker-spindles have been stripped the machine is moved forward to a new position of operation. The flexible shafting is of such a length that a large area may be operated on so that no time will be lost by frequent movements of the machine along the row. It is not necessary that the apparatus be stopped in order to pick the cotton, it being only necessary to stop the machine when the cotton cannot be all picked with the draft-animal moving slowly.

The machine herein described is simple in construction and therefore can be cheaply built, it is easy to operate, and rapid and thoroughly efficient in operation. By having the spindles tapering the cotton can be stripped off more easily when they are drawn through the slotted plates.

I claim:

A cotton-harvester comprising a wheeled supporting-frame, a flexible shafting, a rotating picker-spindle carried thereby, driving means for the shafting, a receptacle carried by the supporting-frame, and a slotted plate arranged adjacent the mouth of the receptacle for stripping the picker-spindle.

In testimony whereof I affix my signature, in presence of two witnesses.

ELIAS ACKORS.

Witnesses:
E. J. BLACKMAN,
E. D. PELSIN.